US007105620B2

(12) United States Patent
Groenendaal et al.

(10) Patent No.: US 7,105,620 B2
(45) Date of Patent: *Sep. 12, 2006

(54) 3,4-ALKYLENEDIOXY-THIOPHENE COPOLYMERS

(75) Inventors: Bert Groenendaal, Sinaai (BE); Frank Louwet, Diepenbeek (BE)

(73) Assignee: Agfa Gevaert, Mortsel (BE)

( * ) Notice: Subject to any disclaimer, the term of this patent is extended or adjusted under 35 U.S.C. 154(b) by 81 days.

This patent is subject to a terminal disclaimer.

(21) Appl. No.: 10/844,551

(22) Filed: May 12, 2004

(65) Prior Publication Data

US 2005/0009986 A1   Jan. 13, 2005

Related U.S. Application Data

(63) Continuation-in-part of application No. 10/321,888, filed on Dec. 17, 2002.

(60) Provisional application No. 60/350,817, filed on Jan. 22, 2002.

(30) Foreign Application Priority Data

Dec. 20, 2001   (EP)   ................................. 01000779

(51) Int. Cl.
   C08F 234/04   (2006.01)
   C08F 28/06    (2006.01)
   C08L 45/00    (2006.01)
   C08G 61/12    (2006.01)
(52) U.S. Cl. ...................... 526/256; 524/811; 526/286; 528/408; 528/403; 525/535; 525/189; 525/389; 525/416
(58) Field of Classification Search ................ 528/373, 528/377, 378, 380, 408, 403; 526/256; 524/811
See application file for complete search history.

(56) References Cited

U.S. PATENT DOCUMENTS

| 5,111,327 | A | 5/1992 | Blohm et al. | |
|---|---|---|---|---|
| 5,187,608 | A | 2/1993 | Blohm et al. | |
| 5,766,515 | A | 6/1998 | Jonas et al. | |
| 6,635,729 | B1 * | 10/2003 | Groenendaal et al. | ...... 526/256 |
| 2002/0077450 | A1 | 6/2002 | Kirchmeyer et al. | |
| 2003/0149171 | A1 | 8/2003 | Groenendaal et al. | |
| 2003/0211331 | A1 | 11/2003 | Louwet et al. | |

FOREIGN PATENT DOCUMENTS

| DE | 198 41 804 A1 * | 3/2000 |
|---|---|---|
| EP | 0 257 573 A1 | 3/1988 |
| EP | 0 339 340 A2 | 11/1989 |
| EP | 0 440 957 A2 | 12/1990 |
| EP | 1 122 274 * | 8/2001 |

OTHER PUBLICATIONS

Anonymous, "Aq. polythiophene antistatic finishing compsn for film-is prepd. by oxidative polymerisation of 3,4-ethylenedioxy thiophene in aq. medium, in presence of catalyst" *Research Disclosure*, vol. 348 (004) (Apr. 10, 1993).
Akoudad et al., *Electrochemistry Comm.*, 2, 72-76 (2000).
Buvat et al., *J. Chim. Phys.*, 95, 1180-1183 (1998).
"Einstazmöglichkeiten für Polythiophene" *Research Disclosure*, No. 373, p. 356, (May 1995).
Groenendaal et al., *Advanced Materials*, 12 (7), 481-494 (2000).
Groenendaal et al., *Synthetic Metals*, 118, 105-109 (2001).
Groenendaal et al., *Advanced Materials*, 15 (11), 855-879 (2003).
Kros et al., *J. Polym. Sci. A, Polym. Chem.*, 40, 738-747 (2002).
Lima et al, *Synthetic Metals*, 93, 33-41 (1998).
Ng et al, *Journal of Materials Science Letters*, vol. 16, 809-811 (1997).
Schanze et al., *Langmuir*, 16, 795-810 (2000).
Schottland et al., *J. Chim. Phys.*, 95, 1258-1261 (1998).
Stéphan et al., *J. Chim. Phys.*, 95, 1168-1171 (1998).
Stéphan et al., *Journal of Electroanalytical Chemistry*, vol. 443, 217-226 (1998).

* cited by examiner

*Primary Examiner*—David W. Wu
*Assistant Examiner*—Rip A. Lee
(74) *Attorney, Agent, or Firm*—Leydig, Voit & Mayer, Ltd

(57) ABSTRACT

An aqueous dispersion of a copolymer of at least one 3,4-alkylenedioxythiophene compound with a solubility in water at 25° C. of less than 2.2 g/L with at least one 3,4-alkylenedioxythiophene compound with a solubility in water at 25° C. of at least 2.2 g/L and a polyanion; a preparation process therefor; its use for coating; a printing ink containing the aqueous dispersion; an electro-conductive layer containing a copolymer of at least one 3,4-alkylenedioxythiophene compound with a solubility in water at 25° C. of less than 2.2 g/L with at least one 3,4-alkylenedioxythiophene compound with a solubility in water at 25° C. of at least 2.2 g/L and a polyanion derived from an aqueous dispersion thereof; and an antistatic layer containing a copolymer of at least one 3,4-alkylenedioxythiophene compound with a solubility in water at 25° C. of less than 2.2 g/L with at least one 3,4-alkylenedioxythiophene compound with a solubility in water at 25° C. of at least 2.2 g/L and a polyanion derived from an aqueous dispersion thereof.

22 Claims, No Drawings

3,4-ALKYLENEDIOXY-THIOPHENE COPOLYMERS

CROSS-REFERENCE TO RELATED PATENT APPLICATIONS

This application is a continuation in part of application Ser. No. 10/321,888, filed Dec. 17, 2002, which claims the benefit of U.S. Provisional Application No. 60/350,817 filed Jan. 22, 2002, and the benefit of European Application No. 01000779.7 filed Dec. 12, 2001, both of which are incorporated by reference.

FIELD OF THE INVENTION

The present invention relates to aqueous dispersions of copolymers of 3,4-alkylenedioxythiophene compounds and polyanions.

BACKGROUND OF THE INVENTION

Numerous polythiophenes have been studied extensively due to their interesting electrical and/or optical properties. Polythiophenes become electrically conducting upon chemical or electrochemical oxidation or reduction.

EP-A 257 573 discloses an intrinsically electrically conductive polymer, wherein through connection in the 2-position and/or the 5-position are coupled to one another, statistically averaged from 60 to 100% by weight structural units, which are derived from at least one monomer of the formula (1):

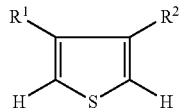

(1)

in which $R^1$ is a C1–C2-alkoxy group or —O(CH$_2$CH$_2$O)$_n$CH$_3$ with n=1 to 4 and $R^2$ is a hydrogen atom, a $C_{1-12}$-alkyl group, a $C_{1-12}$-alkoxy group or —O(CH$_2$CH$_2$O)$_n$CH$_3$ with n=1 to 4, or R and R together are —O(CH$_2$)$_m$—CH$_2$— or —O(CH$_2$)$_m$—O— with m=1 to 12, 0 to 40% by weight structural units, which are derived from at least one monomer of the formula (2):

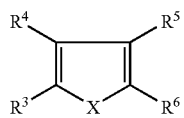

(2)

wherein $R^4$ and $R^5$ are independently of one another a hydrogen atom, a halogen atom, a $C_{1-12}$-alkyl group or aryl or together with C-atoms connected to them form an aromatic ring, $R^3$ and $R^6$ independently of one another represent a hydrogen atom or $R^5$ together with $R^4$ and the C-atoms connected to them or $R^5$ together with $R^6$ and the C-atoms connected to them each form an aromatic ring, X represents an oxygen atom, a sulfur atom, a =NH group, a =N-alkyl group or a =N-aryl group, 0 to 40% by weight structural units, which are derived from at least one monomer of formula (3):

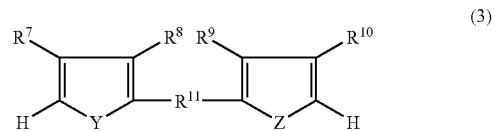

(3)

where $R^7$, $R^8$, $R^9$ and $R^{10}$ independently of one another represent a is hydrogen atom, a $C_{1-12}$-alkyl group, a $C_{1-12}$-alkoxy group or an aryl group, Y and Z independently of one another represent an oxygen atom, a sulfur atom, a =NH group, a =N-alkyl group or a =N-aryl group, $R^{11}$ represents an arylene group, a heteroarylene group or a conjugated system of the formula (CH=CH)$_o$, wherein o is 1, 2 or 3, 0 to 40% by weight structural units, which are derived from at least one monomer of formula (4):

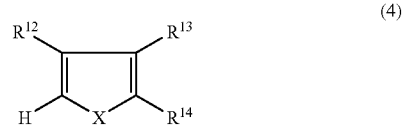

(4)

wherein $R^{12}$ and $R^{13}$ independently of one another represent a hydrogen atom, a halogen atom, a $C_{1-12}$-alkyl group, a $C_{1-12}$-alkoxy group, a $C_{1-4}$-alkylamino group or a $C_{1-4}$-acylamino group, R represents a halogen atom, a $C_{1-12}$-alkyl group, a $C_{1-12}$-alkoxy group, a $C_{1-4}$-alkylamino group or a $C_{1-4}$-acylamino group and X has the meaning given above, wherein the polymer in the oxidized form is completely soluble in dipolar aprotic solvents at 25° C. and solutions with a content of at least 0.1 g of the polymer in 100 mL solvent at 25° C. are obtained.

EP-A 339 340 discloses a polythiophene containing structural units of the formula:

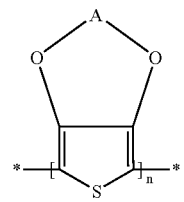

in which A denotes an optionally substituted $C_{1-4}$-alkylene group and its preparation by oxidative polymerization of the corresponding thiophene.

EP-A 440 957 discloses dispersions of polythiophenes, constructed from structural units of formula (I):

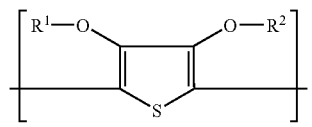

in which $R^1$ and $R^2$ independently of one another represent hydrogen or a $C_{1-4}$-alkyl group or together form an optionally substituted $C_{1-4}$-alkylene residue, in the presence of polyanions.

S. C. Ng et al. in 1997 in Journal of Materials Science Letters, volume 16, pages 809–811 disclosed the synthesis of a mixture of 3,4-dihydro-2H-thieno[3,4-b][1,4]dioxin-2-yl)methanol and 3,4-dihydro-2H-thieno[3,4-b][1,4]dioxepin-3-ol and the chemical copolymerization of this mixture.

O. Stephan et al. in 1998 in Journal of Electroanalytical Chemistry, volume 443, pages 217–226 disclosed the synthesis of (2,3-dihydro-thieno[3,4-b][1,4]dioxin-2-yl-methoxy)-butane-1-sulfonic acid sodium salt and the electrochemical copolymerization thereof with 3,4-ethylenedioxythiophene.

P. Buvat et al. in 1998 in J. Chim. Phys., volume 95, pages 1180–1193 disclosed the preparation of copolymers of 3,4-ethylenedioxythiophene and 3-octylthiophene.

A. Lima et al. in 1998 in Synthetic Metals, volume 93, pages 33–41 disclosed the synthesis and electropolymerization of 3,4-dihydro-2H-thieno[3,4-b][1,4]dioxin-2-yl) methanol.

S. Akoudad et al. in 2000 in Electrochemistry Communications, volume 2, pages 72–76 disclosed the synthesis of 3,4-dihydro-2H-thieno[3,4-b][1,4]dioxin-2-yl)methanol and 2-{2-[2-(2-methoxy-ethoxy)-ethoxymethyl}-2,3-dihydro-thieno[3,4-b][1,4]dioxine and the electrochemical homopolymerization thereof.

For a recent overview of the chemistry and properties of poly(3,4-alkylenedioxythiophene) derivatives, see Groenendaal et al. in 2000 in Advanced Materials, volume 12, pages 481–494.

A general drawback of conductive polymers which have been prepared and studied up to now, is that their conductivities are still too low for certain applications, their visible light transmittances are insufficiently high and/or they are not processable.

OBJECTS OF THE INVENTION

It is therefore an aspect of the present invention to provide 3,4-alkylenedioxythiophene polymers which exhibit high electrical conductivities, high visible light transmittances and/or good processability.

Further aspects and advantages of the invention will become apparent from the description hereinafter.

SUMMARY OF THE INVENTION

It has been surprisingly found that layers containing copolymers of a 3,4-alkylenedioxythiophene compound with a solubility in water at 25° C. of less than 2.2 g/L with a 3,4-alkylenedioxythiophene with a solubility in water at 25° C. of at least 2.2 g/L copolymerized in the presence of a polyanion exhibit surface resistances comparable to or better than those realized with the corresponding homopolymers.

Aspects of the present invention are realized with an aqueous dispersion of a copolymer of at least one 3,4-alkylenedioxythiophene compound with a solubility in water at 25° C. of less than 2.2 g/L with at least one 3,4-alkylenedioxythiophene compound with a solubility in water at 25° C. of at least 2.2 g/L and a polyanion.

Aspects of the present invention are also provided by a chemical polymerization process for preparing the above-described aqueous dispersion comprising the steps of: (i) providing a solution of a polyanion; (ii) adding a 3,4-alkylenedioxythiophene compound with a solubility in water at 25° C. of less than 2.2 g/L and a 3,4-alkylenedioxythiophene compound with a solubility in water at 25° C. of at least 2.2 g/L to the solution provided in step (i); and (iii) adding an oxidizing or reducing system to the mixture provided in step (ii).

Aspects of the present invention are also provided by the use of the above-mentioned aqueous dispersion for coating an object, such as a glass plate, a plastic foil, paper etc.

Aspects of the present invention are also provided by a printable paste containing the above-described aqueous dispersion.

Aspects of the present invention are also provided by an electroconductive layer containing a copolymer of at least one 3,4-alkylenedioxythiophene compound with a solubility in water at 25° C. of less than 2.2 g/L with at least one 3,4-alkylenedioxythiophene compound with a solubility in water at 25° C. of at least 2.2 g/L and a polyanion derived from an aqueous dispersion thereof.

Aspects of the present invention are also provided by an antistatic layer containing a copolymer of at least one 3,4-alkylenedioxythiophene compound with a solubility in water at 25° C. of less than 2.2 g/L with at least one 3,4-alkylenedioxythiophene compound with a solubility in water at 25° C. of at least 2.2 g/L and a polyanion derived from an aqueous dispersion thereof.

Further aspects of the present invention are disclosed in the dependent claims.

DETAILED DESCRIPTION OF THE INVENTION

Definitions

The term $C_{1-5}$-alkylene group or bridge represents methylene, 1,2-ethylene, 1,3-propylene, 1,4-butylene and 1,5-pentylene groups or bridges.

The term alkyl means all variants possible for each number of carbon atoms in the alkyl group i.e. for three carbon atoms: n-propyl and isopropyl; for four carbon atoms: n-butyl, isobutyl and t-butyl; for five carbon atoms: n-pentyl, 1,1-dimethyl-propyl, 2,2-dimethylpropyl and 2-methyl-butyl etc.

The term aqueous for the purposes of the present invention means containing at least 60% by volume of water, preferably at least 80% by volume of water, and optionally containing water-miscible organic solvents such as alcohols e.g. methanol, ethanol, 2-propanol, butanol, iso-amyl alcohol, octanol, cetyl alcohol etc.; glycols e.g. ethylene glycol; glycerine; N-methylpyrrolidone; methoxypropanol; and ketones e.g. 2-propanone and 2-butanone etc.

The term conductive layer as used in disclosing the present invention includes both electroconductive coatings and antistatic layers.

The term electroconductive means having a surface resistance below $10^6$ Ω/square.

The term antistatic means having a surface resistance in the range from $10^6$ to $10^{11}$ Ω/square meaning it cannot be used as an electrode.

The term "conductivity enhancement" refers to a process in which the conductivity is enhanced e.g. by contact with high boiling point liquids such as di- or polyhydroxy- and/or carboxy groups or amide or lactam group containing organic compound optionally followed by heating at elevated temperature, preferably between 100 and 250° C., during preferably 1 to 90 seconds, results in conductivity increase. Alternatively in the case of aprotic compounds with a dielectric constant $\geq 15$, e.g. N-methyl-pyrrolidinone, temperatures below 100° C. can be used. Such conductivity enhancement is observed with polythiophenes and can take place during the preparation of the outermost layer or subsequently. Particularly preferred liquids for such treatment are N-methyl-pyrrolidinone and diethylene glycol such as disclosed in EP-A 686 662 and EP-A 1 003 179.

PEDOT as used in the present disclosure represents poly(3,4-ethylenedioxythiophene).

EDOT as used in the present disclosure represents 3,4-ethylenedioxythiophene.

ADOT as used in the present disclosure represents 3,4-alkylenedioxythiophene.

PSS as used in the present disclosure represents poly(styrenesulphonic acid) or poly(styrenesulphonate).

PET as used in the present disclosure represents poly(ethylene terephthalate).

Aqueous Dispersion

Aspects of the present invention are realized with an aqueous dispersion of a copolymer of at least one 3,4-alkylenedioxythiophene compound with a solubility in water at 25° C. of less than 2.2 g/L with at least one 3,4-alkylenedioxythiophene compound with a solubility in water at 25° C. of at least 2.2 g/L and a polyanion.

A 3,4-alkylenedioxythiophene Compound with a Solubility in Water at 25° C. of less than 2.2 g/L According to a first embodiment of the aqueous dispersion, according to the present invention, the 3,4-alkylenedioxythiophene compound with a solubility in water at 25° C. of less than 2.2 g/L is represented by formula (I):

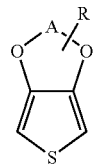

(I)

in which: A represents a $C_{1-5}$-alkylene bridge; R represents an optionally substituted $C_{1-24}$-alkyl, $C_{3-18}$-cycloalkyl, $C_{1-18}$-alkoxy or polyethylene oxide group (optionally with at least one substituent selected from the group consisting of an alcohol, amide, ether, ester or sulfonate group), an optionally substituted aryl group or an optionally substituted acyl group.

According to a second embodiment of the aqueous dispersion, according to the present invention, the 3,4-alkylenedioxythiophene compound with a solubility in water at 25° C. of less than 2.2 g/L is represented by formula (I) in which: A represents a $C_{1-5}$-alkylene bridge; and R represents an optionally substituted $C_{6-20}$-alkyl group.

According to a third embodiment of the aqueous dispersion, according to the present invention, the 3,4-alkylenedioxythiophene compound with a solubility in water at 25° C. of less than 2.2 g/L is represented by formula (I) in which: A represents a $C_{1-5}$-alkylene bridge; and R represents an optionally substituted $C_{8-18}$-alkyl group.

According to a fourth embodiment of the aqueous dispersion, according to the present invention, the 3,4-alkylenedioxythiophene compound with a solubility in water at 25° C. of less than 2.2 g/L is represented by formula (I) in which: A represents a $C_{1-5}$-alkylene bridge; and R represents an optionally substituted $C_{2-24}$-alkyl, $C_{3-18}$-cycloalkyl, $C_{1-18}$-alkoxy or an optionally substituted aryl group contains an ether, an ester or an amide substituent, or in which at least one of the substituents is selected from the group consisting of a sulfonate, phosphonate, halogen and hydroxy group.

According to a fifth embodiment of the aqueous dispersion, according to the present invention, the 3,4-alkylenedioxythiophene compound with a solubility in water at 25° C. of less than 2.2 g/L is 3,4-ethylenedioxythiophene (solubility in water at 25° C. of 2.1 g/L).

Thiophene compounds according to formula(I), according to the present invention, can be prepared by known methods such the transetherification reaction disclosed in DE 3804522 and in HOUBEN-WEYL, volume VI/3, part 3, pages 171–173 (1971) using a thiophene derivative such as 3,4-dimethoxythiophene, or the double Williamson reaction as disclosed in 1994 in Electrochimica Acta in volume 39, pages 1345–1347 using a thiophene derivative such as the dimethyl ester of 3,4-dihydroxythiophene-2,5-dicarboxylic acid.

A 3,4-alkylenedioxythiophene Compound with a Solubility in Water at 25° C. of at Least 2.2 g/L According to a sixth embodiment of the aqueous dispersion, according to the present invention, the 3,4-alkylenedioxythiophene compound with a solubility in water at 25° C. of at least 2.2 g/L has a solubility in water at 25° C. of at least 2.5 g/L.

According to a seventh embodiment of the aqueous dispersion, according to the present invention, the 3,4-alkylenedioxythiophene compound with a solubility in water at 25° C. of at least 2.2 g/L has a solubility in water at 25° C. of at least 2.7 g/L.

According to an eighth embodiment of the aqueous dispersion, according to the present invention, the 3,4-alkylenedioxythiophene compound with a solubility in water at 25° C. of at least 2.2 g/L is represented by formula (II):

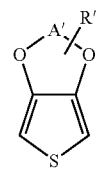

(II)

in which: A' represents a $C_{1-5}$-alkylene bridge; R' represents a hydroxy group, a $C_{1-24}$-alkyl-oxy-R'' group or a $C_{1-24}$-alkyl group substituted with at least one substituent selected from the group consisting of hydroxy, sulfonate and phosphonate, wherein R'' is H or an alkyl, an -alkyl-sulfonate, an -alkyl-carboxylic acid, or an alkyl-terminated polyalkylene oxide group.

According to a ninth embodiment of the aqueous dispersion, according to the present invention, the 3,4-alkylenedioxythiophene compound with a solubility in water at 25° C. of at least 2.2 g/L is represented by formula (II) in which: A' represents a $C_{1-5}$-alkylene bridge; and R' represents a hydroxy group, a $C_{1-5}$-alkyl-oxy-R'' group or a $C_{1-8}$-alkyl group substituted with at least one substituent selected from the group consisting of hydroxy, sulfonate and phosphonate, wherein R'' is H or an $C_{1-5}$-alkyl, an —$C_{1-10}$-alkyl-sulfonate, an —$C_{1-10}$-alkyl-carboxylic acid, or a $C_{1-6}$-alkyl-terminated polyalkylene oxide group.

3,4-alkylenedioxythiophene compounds with a solubility in water at 25° C. of at least 2.2 g/L include:

| Nr | 3,4-alkylenedioxythiophene compound according to formula (II) | | Solubility in water at 25° C. [g/L] |
|---|---|---|---|
| | A' in formula(II) | R' in formula (II) | |
| M1 | Ethylene | —CH$_2$OH | ca. 10 |
| M2 | Propylene | —OH in 2-position | ca. 8.2 |
| M3 | Ethylene | —CH$_2$OCH$_2$COOH | ca. 2.7 |
| M4 | Ethylene | —CH$_2$O(CH$_2$CH$_2$O)$_3$CH$_3$ | ca. 4.5 |
| M5 | Ethylene | —CH$_2$O(CH$_2$CH$_2$O)$_n$CH$_3$ | ca. >128 |
| M6 | Ethylene | —CH$_2$OCH$_2$CH$_2$CH$_2$SO$_3$Na | ca. 167 |

M1 is 3,4-dihydro-2H-thieno[3,4-b][1,4]dioxin-2-yl)methanol, M2 is 3,4-dihydro-2H-thieno[3,4-b][1,4]dioxepin-3-ol, M3 is (2,3-dihydro-thieno[3,4-b][1,4]dioxin-2-yl-methoxy)-acetic acid, M4 is 2-{2-[2-(2-methoxy-ethoxy)-ethoxy]-ethoxymethyl}-2,3-dihydro-thieno[3,4-b][1,4]dioxine and M6 is 4-(2,3-dihydro-thieno[3,4-b][1,4]dioxin-2-yl-methoxy)-butane-1-sulfonic acid sodium salt.

The solubility of the 3,4-alkylenedioxythiophene compounds was determined by adding a particular quantity thereof with stirring to sufficient water so that all the monomer was visually adjudged to have dissolved.

Thiophene compounds according to formula (I), according to the present invention, can be prepared by known methods such the transetherification reaction disclosed in DE 3804522 and in HOUBEN-WEYL, volume VI/3, part 3, pages 171–173 (1971) using a thiophene derivative such as 3,4-dimethoxythiophene, or the double Williamson reaction as disclosed in 1994 in Electrochimica Acta in volume 39, pages 1345–1347 using a thiophene derivative such as the dimethyl ester of 3,4-dihydroxythiophene-2,5-dicarboxylic acid.

Polyanion Compound

The polyanion compounds for use in the dispersion according to the present invention are disclosed in EP-A 440 957 and include polymeric carboxylic acids, e.g. polyacrylic acids, polymethacrylic acids, or polymaleic acids and polysulphonic acids, e.g. poly(styrenesulphonic acid). These polycarboxylic acids and polysulphonic acids can also be copolymers of vinylcarboxylic acids and vinylsulphonic acids with other polymerizable monomers, e.g. acrylic acid esters, methacrylic acid esters and styrene.

According to a tenth embodiment of the aqueous dispersion according to the present invention, the polyanion is poly(styrenesulphonate), the anion of poly(styrene sulphonic acid).

Chemical Polymerization Process

Aspects of the present invention are realized by a chemical polymerization process for preparing an aqueous dispersion, according to the present invention, comprising the steps of: (i) providing a solution of a polyanion; (ii) adding a 3,4-alkylenedioxythiophene compound with a solubility in water at 25° C. of less than 2.2 g/L and a 3,4-alkylenedioxythiophene compound with a solubility in water at 25° C. of at least 2.2 g/L to the solution provided in step (i); and (iii) adding an oxidizing or reducing system to the mixture provided in step (ii).

Copolymers of at least one 3,4-alkylenedioxythiophene compound with a solubility in water at 25° C. of less than 2.2 g/L with at least one 3,4-alkylenedioxythiophene compound with a solubility in water at 25° C. of at least 2.2 g/L can be copolymerized chemically (oxidatively and reductively).

The oxidation agents used for the oxidative polymerisation of pyrrole, such as described for example in Journal of the American Chemical Society, volume 85, pages 454–458 (1963) and J. Polymer Science Part A Polymer Chemistry, volume 26, pages 1287–1294 (1988), can be utilized for the oxidative polymerization of thiophenes.

According to a first embodiment of the chemical polymerization process, according to the present invention, the inexpensive and easily accessible oxidation agents such as iron (III) salts such as FeCl$_3$, the iron (III) salts of organic acids, e.g. Fe(OTs)$_3$, H$_2$O$_2$, K$_2$Cr$_2$O$_7$, alkali and ammonium persulphates, alkali perborates and potassium permanganate are used in the oxidative polymerization.

Theoretically the oxidative polymerization of thiophenes requires 2.25 equivalents of oxidation agent per mole thiophene of formula (I) [see e.g. J. Polymer Science Part A Polymer Chemistry, volume 26, pages 1287–1294 (1988)]. In practice an excess of 0.1 to 2 equivalents of oxidation agent is used per polymerizable unit. The use of persulphates and iron (III) salts has the great technical advantage that they do not act corrosively. Furthermore, in the presence of particular additives oxidative polymerization of the thiophene compounds according to formula (I) proceeds so slowly that the thiophenes and oxidation agent can be brought together as a solution or paste and applied to the substrate to be treated. After application of such solutions or pastes the oxidative polymerization can be accelerated by heating the coated substrate as disclosed in U.S. Pat. No. 6,001,281 and WO 00/14139 herein incorporated by reference.

Reductive polymerization can be carried out using Stille (organotin) routes or Suzuki (organoboron) routes as disclosed in 2001 in Tetrahedron Letters, volume 42, pages 155–157 and in 1998 in Macromolecules, volume 31, pages 2047–2056 respectively or with nickel complexes as disclosed in 1999 in Bull. Chem. Soc. Japan, volume 72, page 621 and in 1998 in Advanced Materials, volume 10, pages 93–116.

INDUSTRIAL APPLICATION

Chemically polymerized copolymers of at least one 3,4-alkylenedioxythiophene compound with a solubility in water at 25° C. of less than 2.2 g/L with at least one 3,4-alkylenedioxythiophene compound with a solubility in water at 25° C. of at least 2.2 g/L exhibit high electrical conductivity together with low absorption of visible light and high absorption to infrared radiation. Such thiophene copolymers can be applied to a wide variety of rigid and flexible substrates, e.g. ceramics, glass and plastics, and are particularly suitable for flexible substrates such as plastic sheeting and the substrates can be substantially bent and deformed without the thiophene copolymer layer losing its electrical conductivity.

Such thiophene copolymers can, for example, be utilized in photovoltaic devices, batteries, capacitors and organic and inorganic electroluminescent devices, in electromagnetic shielding layers, in heat shielding layers, in antistatic coatings for a wide variety of products including photographic film, thermographic recording materials and photothermographic recording materials, in smart windows, in electrochromic devices, in sensors for organic and bio-organic materials, in field effect transistors, in printing plates, in conductive resin adhesives and in free-standing electrically conductive films [see also chapter 10 of the Handbook of Oligo- and Polythiophenes, Edited by D. Fichou, Wiley-VCH, Weinheim (1999)].

The invention is illustrated hereinafter by way of comparative and invention examples. The percentages and ratios given in these examples are by weight unless otherwise indicated.

SYNTHESIS OF CO-MONOMERS

Synthesis of 2-acetoxymethyl-2,3-dihydro-thieno[3,4-b][1,4]dioxine-5,7-dicarboxylic acid dimethyl ester

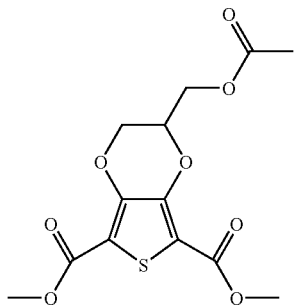

A 70/30 molar mixture of 2-acetoxymethyl-2,3-dihydro-thieno[3,4-b][1,4]dioxine-5,7-dicarboxylic acid dimethyl ester and 3-acetoxy-3,4-dihydro-2H-thieno[3,4-b][1,4]dioxepine-6,8-dicarboxylic acid dimethyl ester was obtained by performing the reaction between 3,4-dihydroxythiophene-2,5-dicarboxylic acid dimethyl ester and epibromohydrin as described in U.S. Pat. No. 5,111,327. This mixture was subsequently separated by an acetylation/selective crystallization procedure: the 70/30 molar mixture of 2-acetoxymethyl-2,3-dihydro-thieno[3,4-b][1,4]dioxine-5,7-dicarboxylic acid dimethyl ester and 3-acetoxy-3,4-dihydro-2H-thieno[3,4-b][1,4]dioxepine-6,8-dicarboxylic acid dimethyl ester (143 g, 0.496 mol) was dissolved in methylene chloride (1.5 L). Triethylamine (80 mL) was subsequently added after which acetyl chloride (43 mL) was added dropwise, constantly keeping the reaction around 25° C. by slight cooling. After addition the mixture was stirred for another hour at 25° C.

Subsequently, the reaction mixture was washed several times with 1M hydrochloric acid, 1M aqueous sodium hydrogen carbonate solution and saturated aqueous sodium chloride solution, respectively. The solvent was removed and the resulting solid was recrystallized from ethanol. After filtration and washing of the residue, pure 2-acetoxymethyl-2,3-dihydro-thieno[3,4-b][1,4]dioxine-5,7-dicarboxylic acid dimethyl ester was obtained as demonstrated by NMR and mass spectroscopy.

Synthesis of 3-acetoxy-3,4-dihydro-2H-thieno[3,4-b][1,4]dioxepine-6,8-dicarboxylic acid dimethyl ester

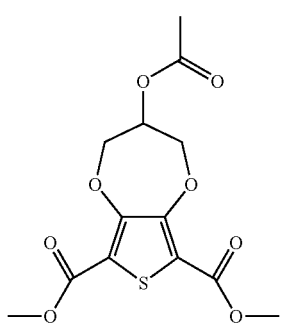

Its seven-membered ring isomer, 3-acetoxy-3,4-dihydro-2H-thieno[3,4-b][1,4]dioxepine-6,8-dicarboxylic acid dimethyl ester, could be isolated by concentrating the filtrate of the above-mentioned recrystallization process. The remaining residue, being a mixture of 2-acetoxymethyl-2,3-dihydro-thieno[3,4-b][1,4]dioxine-5,7-dicarboxylic acid dimethyl ester and 3-acetoxy-3,4-dihydro-2H-thieno[3,4-b][1,4]dioxepine-6,8-dicarboxylic acid dimethyl ester (molar ration ca. 1:2) was subsequently separated into the individual compounds by column chromatography using $SiO_2$ (eluant: methylene chloride/ethyl acetate=90/10). This finally resulted in pure 3-acetoxy-3,4-dihydro-2H-thieno[3,4-b][1,4]dioxepine-6,8-dicarboxylic acid dimethyl ester as well as some additional pure 2-acetoxymethyl-2,3-dihydro-thieno[3,4-b][1,4]dioxine-5,7-dicarboxylic acid dimethyl ester.

Synthesis of 2-hydroxymethyl-2,3-dihydro-thieno[3,4-b][1,4]dioxine-5,7-dicarboxylic acid

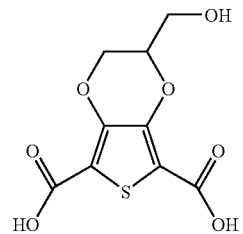

2-Acetoxymethyl-2,3-dihydro-thieno[3,4-b][1,4]dioxine-5,7-dicarboxylic acid dimethyl ester (60 g, 0.18 mol) was dissolved in ethanol (680 mL). potassium hydroxide (36 g) was added to this solution after which water (500 mL) was added upon continuous cooling. After addition of the water the reaction mixture was stirred for another 30 minutes after which the solvents were removed by distillation. To the remaining part of the reaction mixture, we dropwise added a mixture of ice (50 g) and concentrated hydrochloric acid (25 mL), and stirred. The mixture was then filtered and the residue was washed with water. Subsequent drying resulted in quantitative formation of pure 2-hydroxymethyl-2,3-dihydro-thieno[3,4-b][1,4]dioxine-5,7-dicarboxylic acid as demonstrated by NMR and mass spectroscopy.

Synthesis of 3-hydroxy-3,4-dihydro-2H-thieno[3,4-b][1,4]dioxepine-6,8-dicarboxylic acid

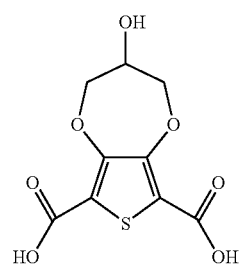

Pure 3-hydroxy-3,4-dihydro-2H-thieno[3,4-b][1,4]dioxepine-6,8-dicarboxylic acid was prepared analogously to the synthesis of 2-hydroxymethyl-2,3-dihydro-thieno[3,4-b][1,4]dioxine-5,7-dicarboxylic acid as described above and applying the same molar quantities of reagents.

Synthesis of (2,3-dihydro-thieno[3,4-b][1,4]dioxin-2-yl)-methanol (M1)

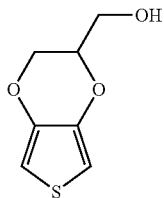

2-Hydroxymethyl-2,3-dihydro-thieno[3,4-b][1,4]dioxine-5,7-dicarboxylic acid (48 g, 0.184 mol) was dissolved in N,N-dimethylacetamide (500 mL), and $Cu_2Cr_2O_7$ (8.6 g) and quinoline (15 drops) were added. This mixture was subsequently stirred for 2 hours at 150° C., after which it was cooled to 25° C. It was then poured into ethyl acetate, the catalyst was removed by filtration and the filtrate was washed with acidic water and an aqueous saturated sodium chloride solution. Subsequently, the solvent was removed after which pure (2,3-dihydro-thieno[3,4-b][1,4]dioxin-2-yl)-methanol was isolated by vacuum distillation (115–120° C.; 0.05 mm Hg).

Synthesis of 3,4-dihydro-2H-thieno[3,4-b][1,4]dioxepin-3-ol (M2)

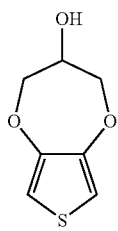

Pure 3,4-dihydro-2H-thieno[3,4-b][1,4]dioxepin-3-ol was prepared analogously to the synthesis of (2,3-dihydro-thieno[3,4-b][1,4]dioxin-2-yl)-methanol as described above and applying the same molar quantities of reagents. Purification was accomplished by column chromatography with $SiO_2$ (eluant: $CH_2Cl_2$).

Synthesis of (2,3-dihydro-thieno[3,4-b][1,4]dioxin-2-yl-methoxy)-acetic acid (M3)

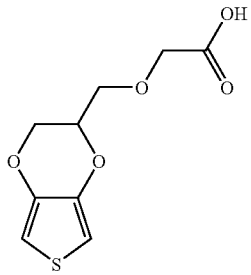

(2,3-Dihydro-thieno[3,4-b)][1,4]dioxin-2-ylmethoxy)-acetic acid ethyl ester (10.2 g, 40 mmol) was dissolved into ethanol (100 mL) and water (50 mL), blanketed by nitrogen. Potassium hydroxide (2.9 g) was added and the mixture was heated at 35° C. for 30 min. The solvents were then removed by distillation, ethyl acetate (50 mL), ice-water (50 mL) and concentrated hydrochloric acid (5 mL) were added and the mixture was vigorously stirred. Subsequently, the organic phase was separated, washed with an aqueous, saturated sodium chloride solution, dried with anhydrous magnesium sulphate and concentrated. Finally the raw product was recrystallized from ethyl acetate/hexanes (1/1) resulting in pure (2,3-dihydro-thieno[3,4-b][1,4]dioxin-2-ylmethoxy)-acetic acid as demonstrated by NMR and mass spectroscopy.

Synthesis of 2-{2-[2-(2-methoxy-ethoxy)-ethoxy]-ethoxymethyl}-2,3-dihydro-thieno[3,4-b][1,4]dioxine (M4)

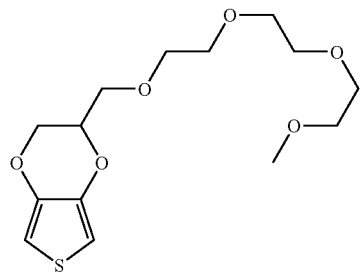

A transetherification reaction between 3,4-dimethoxythiophene (12.9 g, 89 mmol) and {2-[2-(2-methoxyethoxy)-ethoxy]-ethoxymethyl}-1,2-ethanediol (24.5 g) in toluene (150 mL) was performed by heating (at 100° C.) a mixture of these compounds under a continuous nitrogen flow for 24 h. Subsequently, the reaction mixture was poured into methylene chloride (200 mL) and the organic phase was washed with a 1M aqueous sodium hydrogen carbonate solution, an aqueous concentrated sodium chloride solution, dried with anhydrous magnesium sulphate and concentrated. This resulted in a viscous oil. Pure 2-{2-[2-(2-methoxyethoxy)-ethoxy]-ethoxymethyl}-2,3-dihydro-thieno[3,4-b][1,4]dioxine was finally obtained by vacuum distillation.

Synthesis of Polyethylene Oxide Substituted (2,3-dihydro-thieno[3,4-b][1,4]dioxin-2-yl)-methanol (M5)

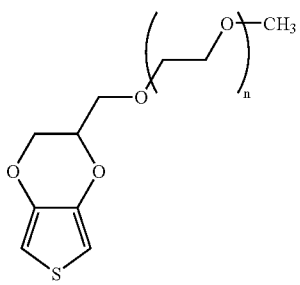

p-Toluenesulfonyl chloride (8.4 g, 44 mmol) was dissolved in pyridine (20 mL), blanketed by $N_2$. A solution of monohydroxy-functionalized polyethylene oxide (Mw=750 g/mol, 15 g, 20 mmol) in pyridine (30 mL) was added dropwise, constantly keeping the reaction temperature around 25–30° C. After addition the reaction mixture was stirred for another 2 h and then poured into ice-water/hydrochloric acid. This aqueous phase was extracted with methylene chloride after which the combined organic fractions were washed with a 1M aqueous solution of sodium hydrogen carbonate. Final purification was done by column chromatography ($SiO_2$, eluant: methylene chloride and ethanol, respectively) resulting in pure tosylate functionalized polyethylene oxide.

(2,3-Dihydro-thieno[3,4-b][1,4]dioxin-2-yl)-methanol (1.0 g, 5.8 mmol) was dissolved into tetrahydrofuran (25 mL) and blanketed by nitrogen. Sodium hydride (0.25 g) was added and stirring was continued for 30 min. Then a solution of the tosylated polyethylene oxide (5.3 g) in tetrahydrofuran (25 mL) was added dropwise. After addition the reaction mixture was brought to reflux for 2 h after which it was cooled to 25° C. again. The reaction mixture was then poured into ice-water (containing a few drops of concentrated hydrochloric acid) and extraction was performed using methylene chloride. The combined organic fraction were then washed with a 1M aqueous solution of sodium hydrogen carbonate and an aqueous, saturated sodium chloride solution, dried with anhydrous magnesium sulphate and concentrated. Final purification by column chromatography (SiO2, eluant: methylene chloride/methanol (95/5) ) resulted in pure PEO-substituted EDOT as was demonstrated with NMR and GPC.

Synthesis of 4-(2,3-dihydro-thieno[3,4-b)][1,4]dioxin-2-yl-methoxy)-butane-1-sulfonic acid sodium salt (M6)

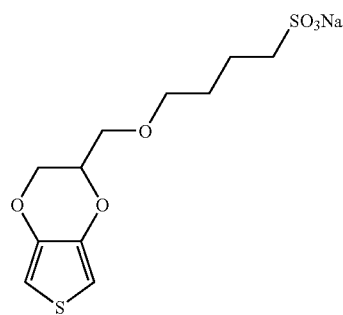

(2,3-Dihydro-thieno[3,4-b][1,4]dioxin-2-yl)-methanol (6.9 g, 40 mmol) was dissolved into tetrahydrofuran (100 mL) and blanketed by nitrogen. Sodium hydride (1.76 g) was added and stirring was continued for 30 min. Then butane-sultone (6.0 g) was added dropwise after which the reaction mixture was brought to reflux is for 3 h. Then it was cooled to 25° C. again, the solvent was removed, methanol was added, the mixture was stirred, filtered and the filtrate was concentrated. The remaining oil was solidified by addition of hexanes and ethanol, followed by stirring. Final filtration and drying resulted in pure 4-(2,3-dihydro-thieno[3,4-b][1,4]dioxin-2-ylmethoxy)-butane-1-sulfonic acid sodium salt as was demonstrated by NMR and mass spectroscopy.

Preparation of 3,4-Alkylenedioxythiophene-Homopolymers

COMPARATIVE EXAMPLE 1

At 25° C., 562.5 g of a 5.6% by weight aqueous solution of poly(styrene sulphonic acid) [PSS] (Mw=290,000), 2437.5 g of deionized water and 12.78 g (90 mmol) EDOT were mixed in a 4L reaction vessel equipped with a stirrer. 0.225 g $Fe_2(SO_4)_3.9H_2O$ and 25.7 g $Na_2S_2O_8$ were then added to initiate the polymerization reaction. The reaction mixture was stirred at 25° C. for 7 h, after which a further 4.3 g of $Na_2S_2O_8$ was added. After an additional reaction time of 16 h the reaction mixture was treated 2 times with ion exchanger (300 ml Lewatit™ S100MB+500 ml Lewatit™ M600MB from BAYER). The resulting mixture was additionally thermally treated at 95° C. for 2 h and the resulting viscous mixture treated with high shear (microfluidizer at 600 Bar). This procedure yielded 1800 g of a 1.09 wt % blue dispersion of P1.

COMPARATIVE EXAMPLE 2

At 25° C., 438.23 g of a 5.99% by weight aqueous solution of poly(styrenesulphonic acid) [PSS] (Mw=290,000) and 2061.77 g deionized water were mixed in a 4L reaction vessel equipped with a stirrer and a nitrogen inlet. After bubbling nitrogen through this mixture for is 30 minutes, 12.78 g (90 mmol) of EDOT were added to this solution. 0.225 g $Fe_2(SO_4)_3$ $9H_2O$ and 25.7 g $Na_2S_2O_8$ were then added to initiate the polymerization reaction. The reaction mixture was stirred at 25° C. for 7 h, after which a further 4.3 g of $Na_2S_2O_8$ was added. After an additional reaction time of 16 h the reaction mixture was treated 2 times with ion exchanger (300 ml Lewatit™ S100MB+500 ml Lewatit™ M600MB from BAYER). The resulting mixture was additionally thermally treated at 95° C. for 2 h and the resulting viscous mixture treated with high shear (microfluidizer at 600 Bar). This procedure yielded 1950 g of a 1.02 wt % blue dispersion of P2.

COMPARATIVE EXAMPLE 3

At 25° C., 438.23 g of a 5.99% by weight aqueous solution of poly(styrene sulphonic acid) [PSS] (Mw=290,000) were mixed with 2061.77 g of deionized water in a 4L reaction vessel equipped with a stirrer and a nitrogen inlet. After bubbling nitrogen purging through this mixture for 30 minutes, 12.78 g (90 mmol) of EDOT was added. 0.225 g $Fe_2(SO_4)_3$ $9H_2O$ and 25.7 g $Na_2S_2O_8$ were then added to initiate the polymerization reaction. The reaction mixture was stirred at 25° C. for 7 h, after which a further 4.3 g of $Na_2S_2O_8$ was added. After an additional reaction time of 16 h the reaction mixture was treated 2 times with ion exchanger (300 ml Lewatit™ S100MB+500 ml Lewatit™ M600MB). The resulting mixture was additionally thermally treated at 95° C. for 2 h and the resulting viscous mixture was treated with high shear (microfluidizer at 600 Bar). This procedure yielded 1840 g of a 1.03 wt % blue dispersion of P3.

Preparing Electroconductive Layers with Dispersions Based on the Dispersions of COMPARATIVE EXAMPLES 1 TO 3

Coating dispersions were produced by adding 3-glycidoxypropyl-trimethoxysilane, ZONYL® FSO100, a copolymer latex of vinylidene chloride, methacrylate and itaconic acid (88/10/2) and N-methyl pyrrolidinone to the dispersions of COMPARATIVE EXAMPLES 1 to 3 so as to produce layers, upon doctor blade-coating onto a subbed 175 μm poly(ethylene terephthalate) support and drying at 45° C. for 3.5 minutes, with the following composition:

| | |
|---|---|
| PEDOT | 28.9 mg/m² |
| [PEDOT)/PSS | 100 mg/m²] |
| ZONYL ® FSO100 | 8 mg/m² |
| 3-glycidoxypropyl-trimethoxysilane | 100 mg/m² |
| copolymer latex of vinylidene chloride, methacrylate and itaconic acid (88/10/2) | 100 mg/m² |
| N-methyl pyrrolidinone | 2 mL/m² |

Characterization of Electroconductive Layers Prepared with Dispersions Based on Dispersions of Comparative Examples 1 to 3

The optical density of the layers was determined by measuring a stack of 10 strips with a Macbeth® TD904 densitometer using a visible filter and then obtaining therefrom the optical density of a single strip. The values given in Table 1 include the optical density of the PET-support.

The surface resistance of the layers was measured in a room conditioned to a temperature of 25° C. and 30% relative humidity by contacting the printed layer with parallel copper electrodes each 35 mm long and 35 mm apart capable of forming line contacts, the electrodes being separated by a Teflon® insulator. This enabled a direct measurement of the surface resistance to be realized. The results are also summarized in Table 1.

The layers were then exposed to artificial sunlight (provided by a xenon lamp) through a glass filter in an Atlas Material Testing Technology BV, SUNTEST™ CPS apparatus according to DIN 54 004. The factor given in Table 1 is the ratio of surface resistance after x hours Suntest™ exposure to the surface resistance before the Suntest exposure.

nitrogen by applying a potential of 0.7–0.8 V in the cell. A current density of 5 mA cm$^{-2}$ was used in the electropolymerization.

In-situ Electrical Conductivity Measurements

Electrical conductivity measurements were carried out in the absence of monomer in the same three electrode cell in which the electropolymerization was carried out. The electrode for conductivity measurements was a two-band platinum electrode (0.3 cm×0.01 cm for each band) with an interband spacing of 20 μm. The platinum electrode was coated with polymer by the passage of 80 mC, which assured the attainment of limiting resistance conditions. Electrical conductivities were measured by applying a small amplitude (typically 10 mV) DC voltage between the bands and recording the current thereby obtained. Poly(3-methylthiophene) (60 S/cm) was used as an electrical conductivity standard. The results are shown in Table 2.

Electropolymerized homopolymers of EDOT, M1 and M3 exhibited comparable resistivities to one another. Electropolymerized homopolymers of M2, M4 and M6 exhibited significantly higher resistivities than electropolymerized PEDOT.

TABLE 1

| Comparative Example nr | Condition of reaction medium prior to initiator addition | PEDOT/PSS | concentration [wt %] | Initial surface Resistance [Ohm/square] | O.D. | Ratio of surface resistance after 48 h Suntest™ exposure to initial surface resistance |
|---|---|---|---|---|---|---|
| 1 | no oxygen exclusion | P1 | 1.09 | 2900 | 0.067 | 83 |
| 2 | O$_2$ purged by N$_2$ bubble through | P2 | 1.02 | 1200 | 0.066 | 13 |
| 3 | O$_2$ purged by N$_2$ bubble through | P3 | 1.03 | 1200 | 0.065 | 12 |

The results in Table 1 show that the initial surface resistance and the stability of the PEDOT/PSS-layers is strongly dependent upon the conditions under which the polymerization is initiated, driving off oxygen by bubbling through with nitrogen resulting in lower surface resistance and higher stability to 48 h Suntest™ exposure as shown by lower ratios of surface resistance after Suntest™ exposure to the initial surface resistance.

COMPARATIVE EXAMPLES 4 TO 9

Electrochemical Polymerization of EDOT, M1, M2, M3, M4 and M6

Electropolymerization was performed at 25° C. using a standard three electrode cell. The working electrode was platinum, gold or indium-tin-oxide. The counter electrodes was platinum; the reference electrode was silver/0.1 M silver perchlorate in acetonitrile (0.34 V vs SCE).

Acetonitrile solutions 10$^{-3}$ to 10$^{-2}$ M in the monomer of COMPARATIVE EXAMPLES 3 to 8 (EDOT, M1, M2, M3, M4 and M6 respectively) and 0.1 M in NaClO$_4$ were polymerized after purging of oxygen by bubbling through

TABLE 2

| Comparative Example nr | Polymer nr. | monomer nr. | Resistivity [ohm-cm] | Conductivity [S/cm] |
|---|---|---|---|---|
| 4 | P4 | EDOT | 1.67 × 10$^{-3}$ | 599 |
| 5 | P5 | M1 | 2.0 × 10$^{-3}$ | 500 |
| 6 | P6 | M2 | 14.3 × 10$^{-3}$ | 70 |
| 7 | P7 | M3 | 2.5 × 10$^{-3}$ | 400 |
| 8 | P8 | M4 | 14.3 × 10$^{-3}$ | 70 |
| 9 | P9 | M6 | 100 × 10$^{-3}$ | 10 |

COMPARATIVE EXAMPLE 10

Polymerization of 4-(2,3-dihydro-thieno[3,4-b][1,4] dioxin-2-ylmethoxy)-butane-1-sulfonic acid sodium salt 4-(2,3-dihydro-thieno[3,4-b][1,4]dioxin-2-ylmethoxy)-butane-1-sulfonic acid sodium salt (0.66 g, 2.0 mmol) was dissolved in oxygen-free water (20 mL). The solution was heated to 80° C. after which Fe(OTs)$_3$.6H$_2$O (4.06 g, 6.0 mmol) was added. The colour of the solution immediately turned dark blue. The reaction mixture was kept at 80° C. for 3.5 h more, after which it was cooled and filtered. The filtrate was finally freed of iron, sodium and tosylate ions by ion exchange with cationic and anionic resins resulting in a dark blue aqueous PEDOT-S solution. The solution was finally diluted with deionized water to 1% by weight PEDOT-S, P10.

Preparation of
3,4-Alkylenedioxythiophene-Copolymers in
Reaction Media Purged of Oxygen

INVENTION EXAMPLES 1 TO 12

The dispersions of the 3,4-alkylenedioxythiophene copolymers of INVENTION EXAMPLES 1 to 12 were prepared by mixing 87 g of a 5.99% by weight aqueous solution of poly(styrenesulphonic acid) [PSS] (Mw=290,000) with 413 g deionized water at 25° C. in a 1L reaction vessel equipped with a stirrer and a nitrogen inlet. After bubbling nitrogen through this mixture for 30 minutes, EDOT (for quantity see Tables 3A or 3B) and comonomer (for number and quantity see Tables 3A or 3B) were added to this solution. Nitrogen was then again bubbled through the reaction mixture for 30 minutes. 0.0375 g $Fe_2(SO_4)_3$ and 4.28 g $Na_2S_2O_8$ were then added to initiate the copolymerization reaction. The reaction mixture was stirred at 25° C. for 7 h, after which a further 0.7 g of $Na_2S_2O_8$ was added. After an additional reaction time of 16 h the reaction mixture was treated twice with ion exchanger (50 ml Lewatit™ S100MB+80 ml Lewatit™ M600MB from BAYER). The resulting mixture was additionally thermally treated at 95° C. for 2 h and the resulting viscous mixture diluted and treated with high shear (microfluidizer at 600 Bar). This procedure yielded a dispersion of the copolymer (for type, quantity produced and concentration of copolymer in the dispersion see Tables 3A and 3B).

Characterization of Copolymers of Invention
Examples 1 to 12

The molecular weights of the copolymers and the PEDOT of COMPARATIVE EXAMPLE 1 to 3 were determined by aqueous gel permeation chromatography relative to sodium poly(styrene sulphonate) with UV-vis absorption detection at 785 nm.

The molecular weights of the copolymers and PEDOT prepared in reaction media purged of oxygen by bubbling through with 15 nitrogen prior to the addition of initiator together with their concentrations in the dispersions produced and the theoretical concentration in mol % in the comonomer are summarized in Table 4.

TABLE 4

| (Co) polymer nr. | Comonomer Nr. | mol % | Concentration of Copolymer/PSS [wt %] | Molecular weight [785 nm] |
|---|---|---|---|---|
| P2 | — | 0 | 1.02 | 490,000 |
| P3 | — | 0 | 1.03 | 390,000 |
| CP1 | M1 | 10 | 0.78 | 620,000 |
| CP2 | M1 | 20 | 0.82 | 580,000 |
| CP3 | M2 | 10 | 0.82 | 670,000 |
| CP4 | M2 | 20 | 0.83 | 725,000 |
| CP5 | M3 | 10 | 0.76 | 560,000 |
| CP6 | M3 | 20 | 1.14 | 540,000 |
| CP7 | M4 | 10 | 0.65 | 650,000 |
| CP8 | M4 | 20 | 0.70 | 725,000 |
| CP9 | M5 | 10 | 0.8 | 430,000 |
| CP10 | M5 | 20 | 0.8 | 415,000 |
| CP11 | M6 | 10 | 0.80 | 750,000 |
| CP12 | M6 | 20 | 0.82 | 780,000 |

TABLE 3A

| | INVENTION EXAMPLE NUMBER | | | | | |
|---|---|---|---|---|---|---|
| | 1 | 2 | 3 | 4 | 5 | 6 |
| EDOT wt [g] | 1.92 | 1.7 | 1.92 | 1.7 | 1.92 | 1.7 |
| EDOT [mmoles] | 13.5 | 11.96 | 13.5 | 11.96 | 13.5 | 11.96 |
| Comonomer | M1 | M1 | M2 | M2 | M3 | M3 |
| Comonomer wt [g] | 0.258 | 0.516 | 0.258 | 0.516 | 0.345 | 0.69 |
| Comonomer [mmoles] | 1.49 | 3.00 | 1.49 | 3.00 | 1.49 | 3.00 |
| Copolymer dispersion | CP1 | CP2 | CP3 | CP4 | CP5 | CP6 |
| wt of (co)polymer dispersion prepared [g] | 570 | 470 | 560 | 495 | 450 | 455 |
| (co)polymer concentration in dispersion 2[wt %] | 0.78 | 0.82 | 0.82 | 0.83 | 0.76 | 1.14 |

TABLE 3B

| | INVENTION EXAMPLE NUMBER | | | | | |
|---|---|---|---|---|---|---|
| | 7 | 8 | 9 | 10 | 11 | 12 |
| EDOT wt [g] | 1.92 | 1.7 | 1.92 | 1.7 | 1.92 | 1.7 |
| EDOT [mmoles] | 13.5 | 11.96 | 13.5 | 11.96 | 13.5 | 11.96 |
| Comonomer | M4 | M4 | M5 | M5 | M6 | M6 |
| Comonomer wt [g] | 0.477 | 0.954 | 1.104 | 2.208 | 0.496 | 0.992 |
| Comonomer [mmoles] | 1.49 | 3.00 | 1.49 | 3.00 | 1.49 | 3.00 |
| Copolymer dispersion | CP7 | CP8 | CP9 | CP10 | CP11 | CP12 |
| wt of (co)polymer dispersion prepared [g] | 690 | 680 | 380 | 510 | 570 | 60 |
| (co)polymer concentration in dispersion [wt %] | 0.65 | 0.70 | 0.80 | 0.80 | 0.80 | 0.82 |

Preparation of Layers Prepared with Dispersions Containing the Copolymers of Invention Examples 1 to 12

Coating dispersions were prepared with the dispersions of INVENTION EXAMPLES 1 to 12 as described above for the dispersion of COMPARATIVE EXAMPLES 1 to 3 so as to produce layers, upon doctor blade-coating onto a subbed 175 μm poly(ethylene terephthalate) support and drying at 45° C. for 3.5 minutes, with the following composition:

| | |
|---|---|
| Copolymer of ADOT and comonomer (or PEDOT) | 28.9 mg/m² |
| [copolymer of ADOT and comonomer (or PEDOT)/PSS | 100 mg/m²] |
| ZONYL ® FSO100 | 8 mg/m² |
| 3-glycidoxypropyl-trimethoxysilane | 100 mg/m² |
| copolymer latex of vinylidene chloride, methacrylate and itaconic acid (88/10/2) | 100 mg/m² |
| N-methyl pyrrolidinone | 2 mL/m2 |

Characterization of Layers Containing Copolymers of Invention Examples 1 to 12

The surface resistance and optical density and the light stability of the layers containing the copolymers of INVENTION EXAMPLES 1 to 12 were determined as described above for the layers containing the homopolymers of COMPARATIVE EXAMPLES 1 to 3. The results are summarized in Table 5.

TABLE 5

| | | | | Layer containing (co)polymer | | |
|---|---|---|---|---|---|---|
| Example | (Co)polymer | Comonomer | | Surface resistance | Ratio of surface resistance after 48 h Suntest ™ exposure | |
| Nr | nr. | nr. | mol % | [Ω/square] | to initial surface resistance | O.D. |
| COMP 2 | P2 | — | 0 | 1200 | 13 | 0.066 |
| COMP 3 | P3 | — | 0 | 1200 | 12 | 0.065 |
| INV 1 | CP1 | M1 | 10 | 1300 | 21 | 0.068 |
| INV 2 | CP2 | M1 | 20 | 1400 | 27 | 0.068 |
| INV 3 | CP3 | M2 | 10 | 1300 | 24 | 0.067 |
| INV 4 | CP4 | M2 | 20 | 1200 | 20 | 0.067 |
| INV 5 | CP5 | M3 | 10 | 2200 | 74 | 0.060 |
| INV 6 | CP6 | M3 | 20 | 2500 | 72 | 0.063 |
| INV 7 | CP7 | M4 | 10 | 1700 | 38 | 0.067 |
| INV 8 | CP8 | M4 | 20 | 1300 | 24 | 0.067 |
| INV 9 | CP9 | M5 | 10 | 5800 | 91 | 0.067 |
| INV 10 | CP10 | M5 | 20 | 23000 | 1766 | 0.062 |
| INV 11 | CP11 | M6 | 10 | 1900 | 28 | 0.069 |
| INV 12 | CP12 | M6 | 20 | 1800 | 22 | 0.066 |

The expected properties of the EDOT-copolymers are intermediate between those of the corresponding homopolymers. However, the layers containing copolymers CP1, CP2, CP3, CP4 and CP8, copolymers of EDOT with M1, M2 and M4, exhibited comparable properties to those of P2 and P3.

Having described in detail preferred embodiments of the current invention, it will now be apparent to those skilled in the art that numerous modifications can be made therein without departing from the scope of the invention as defined in the following claims.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Of course, variations of those preferred embodiments will become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

We claim:

1. A chemical polymerization process for preparing an aqueous dispersion of a copolymer of at least one 3,4-alkylenedioxythiophene compound with a solubility in water at 25° C. of less than 2.2 g/L with at least one 3,4-alkylenedioxythiophene compound with a solubility in water at 25° C. of at least 2.2 g/L and a polyanion comprising the steps of: (i) providing a solution of a polyanion; (ii)

adding a 3,4-alkylenedioxythiophene compound with a solubility in water at 25° C. of less than 2.2 g/L and a 3,4-alkylenedioxythiophene compound with a solubility in water at 25° C. of at least 2.2 g/L to the solution provided in step (i); and (iii) adding an oxidizing or reducing system to the mixture provided in step (ii).

2. An electroconductive layer derived from an aqueous dispersion comprising a polyanion and a copolymer of at least one 3,4-alkylenedioxythiophene compound with a solubility in water at 25° C. of less than 2.2 g/L with at least one 3,4-alkylenedioxythiophene compound with a solubility in water at 25° C. of at least 2.2 g/L.

3. An electroconductive layer according to claim 2, wherein said 3,4-alkylenedioxythiophene compound with a solubility in water at 25° C. of at least 2.2 g/L is represented by formula (II):

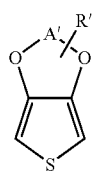

(II)

in which: A' represents a $C_{1-5}$-alkylene bridge; R' represents a hydroxy group, a $C_{1-24}$-alkyl-oxy-R" group or a $C_{1-24}$-alkyl group substituted with at least one substituent selected from the group consisting of hydroxy, sulfonate and phosphonate, wherein R" is H or an alkyl, an -alkyl-sulfonate, an -alkyl-carboxylic acid, or an alkyl-terminated polyalkylene oxide group.

4. An electroconductive layer according to claim 2, wherein said 3,4-alkylenedioxythiophene compound with a solubility in water at 25° C. of at least 2.2 g/L has a solubility in water at 25° C. of at least 2.5 g/L.

5. An electroconductive layer according to claim 2, wherein said 3,4-alkylenedioxythiophene compound with a solubility in water at 25° C. of at least 2.2 g/L has a solubility in water at 25° C. of at least 2.7 g/L.

6. An aqueous dispersion according to claim 2, wherein said polyanion is poly(styrenesulphonate).

7. An antistatic layer derived from an aqueous dispersion comprising a polyanion and a copolymer of at least one 3,4-alkylenedioxythiophene compound with a solubility in water at 25° C. of less than 2.2 g/L with at least one 3,4-alkylenedioxythiophene compound with a solubility in water at 25° C. of at least 2.2 g/L.

8. An antistatic layer according to claim 7, wherein said 3,4-alkylenedioxythiophene compound with a solubility in water at 25° C. of less than 2.2 g/L is represented by formula (I):

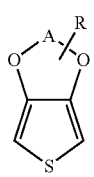

(I)

in which A represents a $C_{1-5}$-alkylene bridge; R represents an optionally substituted $C_{1-24}$-alkyl, $C_{3-18}$-cycloalkyl, $C_{1-18}$-alkoxy or polyethylene oxide group (optionally with at least one substituent selected from the group consisting of an alcohol, amide, ether, ester or sulfonate group) or an optionally substituted aryl group.

9. An antistatic layer according to claim 7, wherein said 3,4-alkylenedioxythiophene compound with a solubility in water at 25° C. of at least 2.2 g/L is represented by formula (II):

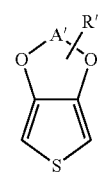

(II)

in which: A' represents a $C_{1-5}$-alkylene bridge; R' represents a hydroxy group, a $C_{1-24}$-alkyl-oxy-R" group or a $C_{1-24}$-alkyl group substituted with at least one substituent selected from the group consisting of hydroxy, sulfonate and phosphonate, wherein R" is H or an alkyl, an -alkyl-sulfonate, an -alkyl-carboxylic acid, or an alkyl-terminated polyalkylene oxide group.

10. An antistatic layer according to claim 7, wherein said 3,4-alkylenedioxythiophene compound with a solubility in water at 25° C. of at least 2.2 g/L has a solubility in water at 25° C. of at least 2.5 g/L.

11. An antistatic layer according to claim 7, wherein said 3,4-alkylenedioxythiophene compound with a solubility in water at 25° C. of at least 2.2 g/L has a solubility in water at 25° C. of at least 2.7 g/L.

12. An aqueous dispersion according to claim 7, wherein said polyanion is poly(styrenesulphonate).

13. An aqueous dispersion of a copolymer of at least one 3,4-alkylenedioxythiophene compound with a solubility in water at 25° C. of less than 2.2 g/L with at least one 3,4-alkylenedioxythiophene compound with a solubility in water at 25° C. of at least 2.2 g/L and a polyanion, wherein said 3,4-alkylenedioxythiophene compound with a solubility in water at 25° C. of less than 2.2 g/L is represented by formula (I):

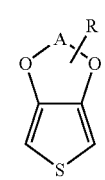

(I)

in which A represents a $C_{1-5}$-alkylene bridge; R represents an optionally substituted $C_{1-24}$-alkyl, $C_{3-18}$-cycloalkyl, $C_{1-18}$-alkoxy or polyethylene oxide group (optionally with at least one substituent selected from the group consisting of an alcohol, amide, ether, ester or sulfonate group) or an optionally substituted aryl group.

14. An aqueous dispersion according to claim 1, wherein said 3,4-alkylenedioxythiophene compound with a solubil ity in water at 25° C. of at least 2.2 g/L is represented by formula (II):

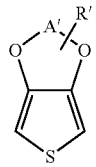
(II)

in which: A' represents a $C_{1-5}$-alkylene bridge; R' represents a hydroxy group, a $C_{1-24}$-alkyl-oxy-R" group or a $C_{1-24}$-alkyl group substituted with at least one substituent selected from the group consisting of hydroxy, sulfonate and phosphonate, wherein R" is H or an alkyl, an -alkyl-sulfonate, an -alkyl-carboxylic acid, or an alkyl-terminated polyalkylene oxide group.

15. An aqueous dispersion according to claim 1, wherein said 3,4-alkylenedioxythiophene compound with a solubility in water at 25° C. of at least 2.2 g/L has a solubility in water at 25° C. of at least 2.5 g/L.

16. An aqueous dispersion according to claim 1, wherein said 3,4-alkylenedioxythiophene compound with a solubility in water at 25° C. of at least 2.2 g/L has a solubility in water at 25° C. of at least 2.7 g/L.

17. An aqueous dispersion according to claim 1, wherein said polyanion is poly(styrenesulphonate).

18. An aqueous dispersion according to claim 14, wherein said 3,4-alkylenedioxythiophene compound with a solubility in water at 25° C. of at least 2.2 g/L has a solubility in water at 25° C. of at least 2.5 g/L.

19. An aqueous dispersion according to claim 14, wherein said 3,4-alkylenedioxythiophene compound with a solubility in water at 25° C. of at least 2.2 g/L has a solubility in water at 25° C. of at least 2.7 g/L.

20. An aqueous dispersion according to claim 14, wherein said polyanion is poly(styrenesulphonate).

21. An aqueous dispersion of a copolymer of at least one 3,4-alkylenedioxythiophene compound with a solubility in water at 25° C. of less than 2.2 g/L with at least one 3,4-alkylenedioxythiophene compound with a solubility in water at 25° C. of at least 2.2 g/L and a polyanion, wherein said 3,4-alkylenedioxythiophene compound with a solubility in water at 25° C. of at least 2.2 g/L is represented by formula (II):

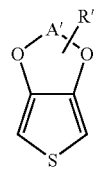
(II)

in which: A' represents a $C_{1-5}$-alkylene bridge; R' represents a hydroxy group, a $C_{1-24}$-alkyl-oxy-R" group or a $C_{1-24}$-alkyl group substituted with at least one substituent selected from the group consisting of hydroxy, sulfonate and phosphonate, wherein R" is H or an alkyl, an -alkyl-sulfonate, an -alkyl-carboxylic acid, or an alkyl-terminated polyalkylene oxide group.

22. An electroconductive layer according to claim 2, wherein said 3,4-alkylenedioxythiophene compound with a solubility in water at 25° C. of less than 2.2 g/L is represented by formula (I):

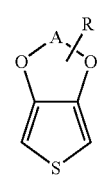
(I)

in which A represents a $C_{1-5}$-alkylene bridge; R represents an optionally substituted $C_{1-24}$-alkyl, $C_{3-18}$-cycloalkyl, $C_{1-18}$-alkoxy or polyethylene oxide group (optionally with at least one substituent selected from the group consisting of an alcohol, amide, ether, ester or sulfonate group) or an optionally substituted aryl group.

* * * * *